US011235791B2

(12) United States Patent
Mize, Jr.

(10) Patent No.: US 11,235,791 B2
(45) Date of Patent: Feb. 1, 2022

(54) COOLER ASSEMBLY

(71) Applicant: Allen Hobbs Mize, Jr., Ocean Springs, MS (US)

(72) Inventor: Allen Hobbs Mize, Jr., Ocean Springs, MS (US)

( * ) Notice: Subject to any disclaimer, the term of this patent is extended or adjusted under 35 U.S.C. 154(b) by 14 days.

(21) Appl. No.: 16/186,480

(22) Filed: Nov. 9, 2018

(65) Prior Publication Data

US 2020/0010102 A1 Jan. 9, 2020

Related U.S. Application Data

(60) Provisional application No. 62/695,829, filed on Jul. 9, 2018.

(51) Int. Cl.
| | |
|---|---|
| *B62B 5/00* | (2006.01) |
| *B62B 3/00* | (2006.01) |
| *B65D 81/38* | (2006.01) |
| *F25D 3/06* | (2006.01) |
| *A45F 3/46* | (2006.01) |

(52) U.S. Cl.
CPC ............... *B62B 3/002* (2013.01); *A45F 3/46* (2013.01); *B62B 5/00* (2013.01); *B65D 81/3816* (2013.01); *B65D 81/3818* (2013.01); *F25D 3/06* (2013.01)

(58) Field of Classification Search
CPC ..... B62B 3/002; B62B 5/00; B62B 2205/104; B62B 5/0083; A45F 3/46; B65D 81/3816; B65D 81/3818; F25D 3/06; F25D 2400/38; B60B 33/0005; B60B 33/001; B60B 33/063; B60B 33/04; B60B 33/02; B60B 33/021; B60B 33/026
See application file for complete search history.

(56) References Cited

U.S. PATENT DOCUMENTS

| | | | | |
|---|---|---|---|---|
| 4,339,212 A | * | 7/1982 | Sauber ....................... | F16B 2/14 403/27 |
| 4,581,902 A | * | 4/1986 | Starck ....................... | A45C 9/00 190/11 |
| 4,846,493 A | * | 7/1989 | Mason .................... | A45C 5/146 280/641 |
| 5,407,218 A | * | 4/1995 | Jackson ................... | A45C 5/14 280/30 |
| 5,423,195 A | * | 6/1995 | Peters ....................... | A45C 5/14 220/694 |
| 5,465,985 A | * | 11/1995 | Devan .................... | A45C 5/146 280/30 |

(Continued)

*Primary Examiner* — Jacob B Meyer
(74) *Attorney, Agent, or Firm* — William C. West

(57) ABSTRACT

Disclosed is a cooler assembly that may be used to attach accessories and/or one or more wheel assemblies to an insulated body of a cooler. The insulated body of the cooler being a container body of a container (i.e., the cooler). The cooler assembly may include any one of or a combination of the following components: the container body (i.e., the insulated body of the cooler); the one or more wheel assemblies with or without adjustable axles for mobility; accessories such as an accessory table and an accessory chair; accessory fastener devices for attaching the accessories to the cooler; and wheel assembly fastener devices for attaching the wheel assemblies to the cooler. The accessory fastener devices and the wheel assembly fastener devices are reusable and may be easily inserted and removed from the cooler or the container for mounting on a second cooler or platform.

30 Claims, 11 Drawing Sheets

(56) References Cited

U.S. PATENT DOCUMENTS

| | | | | |
|---|---|---|---|---|
| 5,911,422 | A * | 6/1999 | Carpenter | B62B 3/007 280/8 |
| 6,028,259 | A * | 2/2000 | Lombardi | G10D 13/11 84/422.1 |
| 6,070,899 | A * | 6/2000 | Gines | B62B 3/027 280/651 |
| 6,360,875 | B1 * | 3/2002 | Altemus, Jr. | B65G 45/16 15/256.5 |
| 6,443,467 | B1 * | 9/2002 | Black | B62B 7/046 280/47.38 |
| 6,745,643 | B2 * | 6/2004 | Lubanski | B62K 15/00 36/131 |
| 7,506,890 | B2 * | 3/2009 | Chen | B60B 33/001 280/47.38 |
| 7,556,321 | B2 * | 7/2009 | Hara | B60B 27/026 301/110.5 |
| 7,571,966 | B2 * | 8/2009 | Chen | B60B 1/006 301/111.01 |
| 8,256,156 | B1 * | 9/2012 | Burgoyne, Jr. | A01K 97/06 43/54.1 |
| 8,382,149 | B1 * | 2/2013 | Liu | B62K 27/02 280/642 |
| 8,505,932 | B1 * | 8/2013 | Piccirillo | B62B 5/0003 280/30 |
| 9,415,787 | B2 * | 8/2016 | Mericle | B62B 3/02 |
| 9,476,638 | B1 * | 10/2016 | Tyler | F25D 3/06 |
| 9,714,788 | B2 * | 7/2017 | Rigoli | F25D 23/12 |
| 10,429,117 | B2 * | 10/2019 | Poirier | B62B 3/004 |
| 10,471,979 | B1 * | 11/2019 | Burpee | E04H 15/32 |
| 10,479,141 | B2 * | 11/2019 | Bastien | B60B 33/0018 |
| 10,492,377 | B2 * | 12/2019 | Volin | A01G 27/005 |
| 10,717,452 | B2 * | 7/2020 | Paisley | B61D 15/00 |
| 2003/0188602 | A1 * | 10/2003 | Lubanski | B62M 3/086 74/594.4 |
| 2004/0144198 | A1 * | 7/2004 | Gatzen | G10D 13/065 74/560 |
| 2006/0048534 | A1 * | 3/2006 | Beal | B62B 5/0026 62/239 |
| 2007/0210544 | A1 * | 9/2007 | Chen | B60B 33/0057 280/47.34 |
| 2008/0001373 | A1 * | 1/2008 | Vaughn | B60B 35/10 280/47.26 |
| 2008/0042487 | A1 * | 2/2008 | Chen | B62B 9/082 301/111.01 |
| 2008/0284127 | A1 * | 11/2008 | Watarai | B62K 25/02 280/279 |
| 2009/0256414 | A1 * | 10/2009 | Hara | B60B 35/04 301/124.2 |
| 2015/0084291 | A1 * | 3/2015 | Yoder | B62B 19/00 280/8 |
| 2015/0191190 | A1 * | 7/2015 | Richardson | B62B 5/0083 280/47.34 |
| 2015/0300721 | A1 * | 10/2015 | Rigoli | F25D 23/12 62/457.7 |
| 2018/0156516 | A1 * | 6/2018 | Vanderberg | B62B 5/067 |
| 2019/0255882 | A1 * | 8/2019 | Bastien | B60B 33/0039 |
| 2019/0337546 | A1 * | 11/2019 | Burpee | E04H 15/32 |
| 2020/0010102 | A1 * | 1/2020 | Mize, Jr. | A45F 3/46 |
| 2020/0130722 | A1 * | 4/2020 | Gamache | B62D 63/065 |
| 2021/0009176 | A1 * | 1/2021 | Panigot | B62B 1/208 |

* cited by examiner

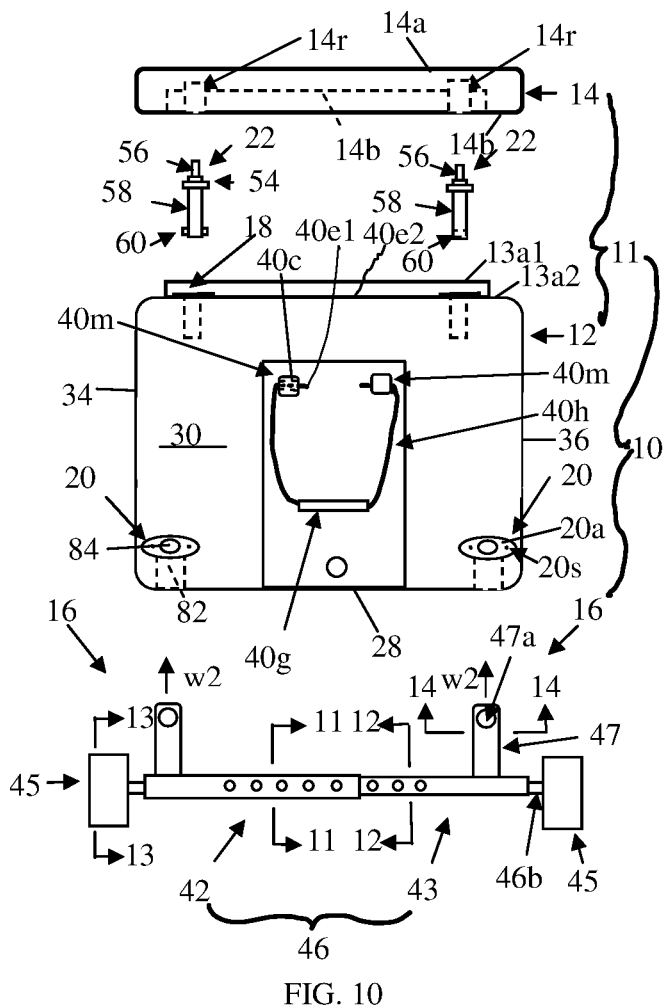
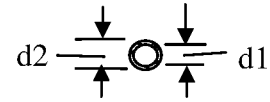
FIG. 11
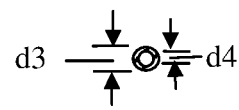
FIG. 12
FIG. 13
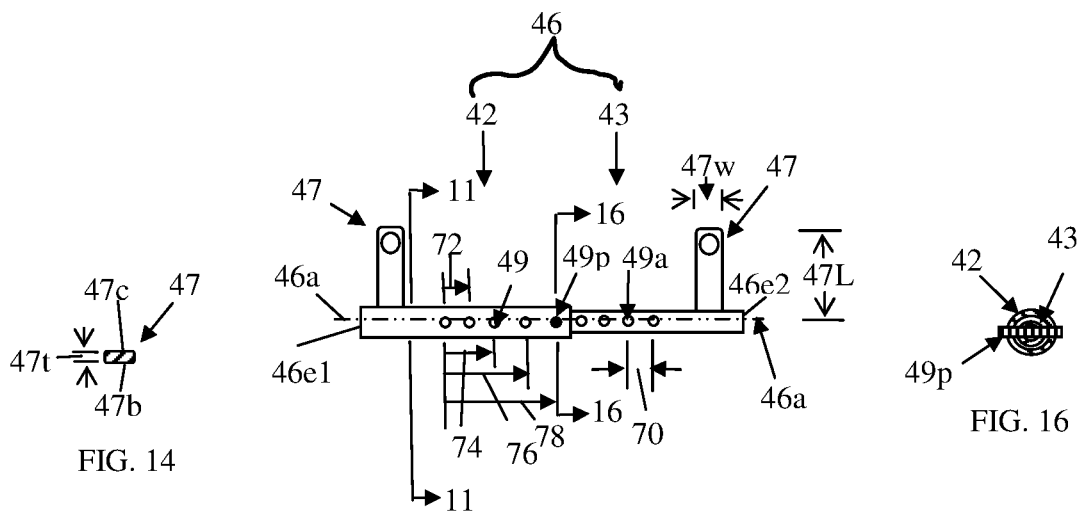
FIG. 15

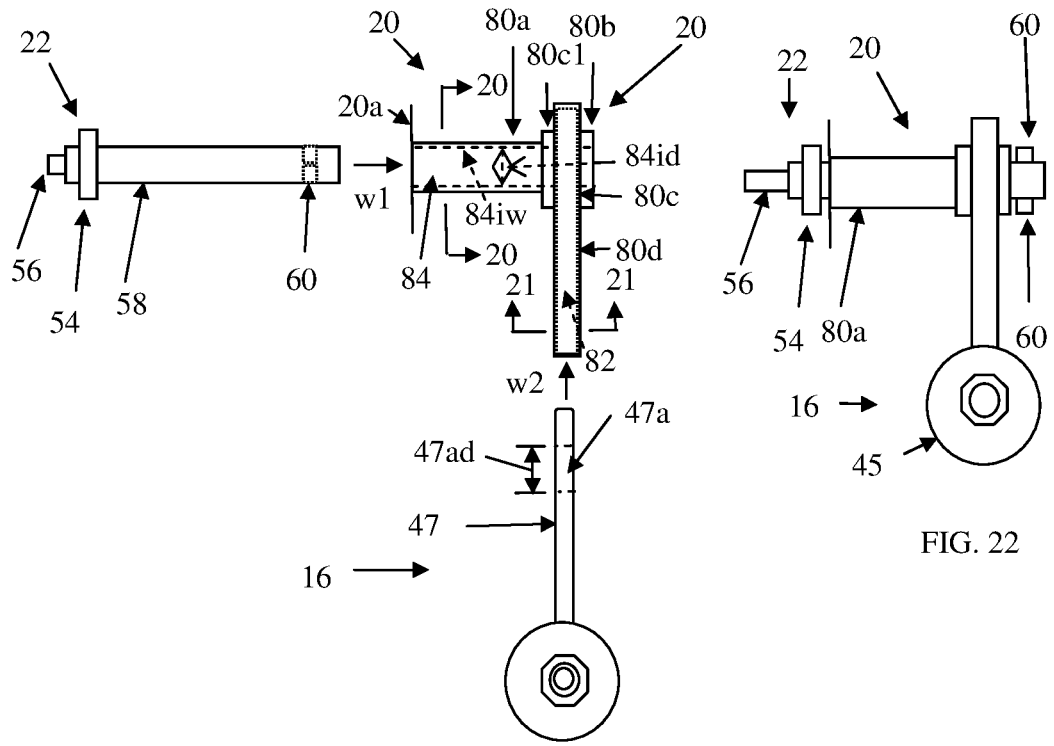
FIG. 19
FIG. 22
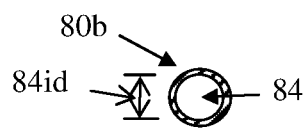
FIG. 20
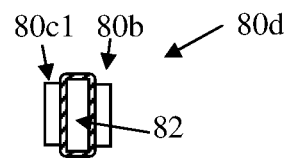
FIG. 21
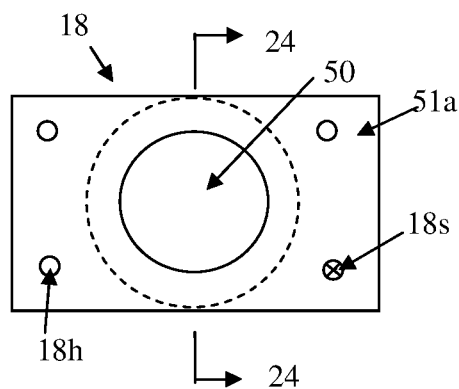
FIG. 23
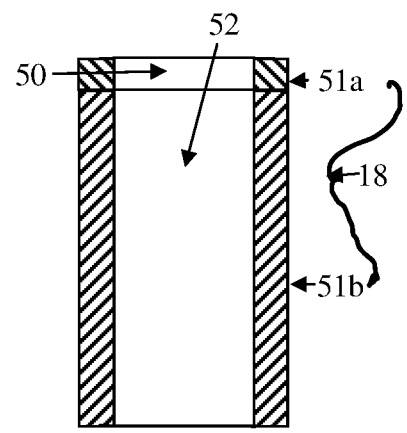
FIG. 24

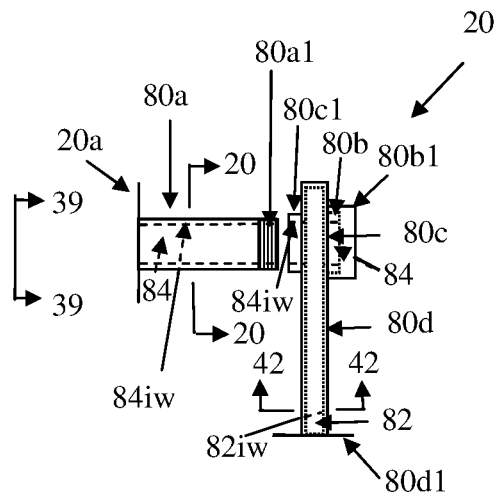
FIG. 41
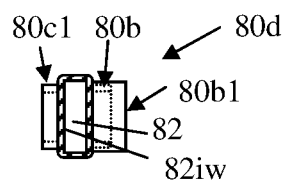
FIG. 42
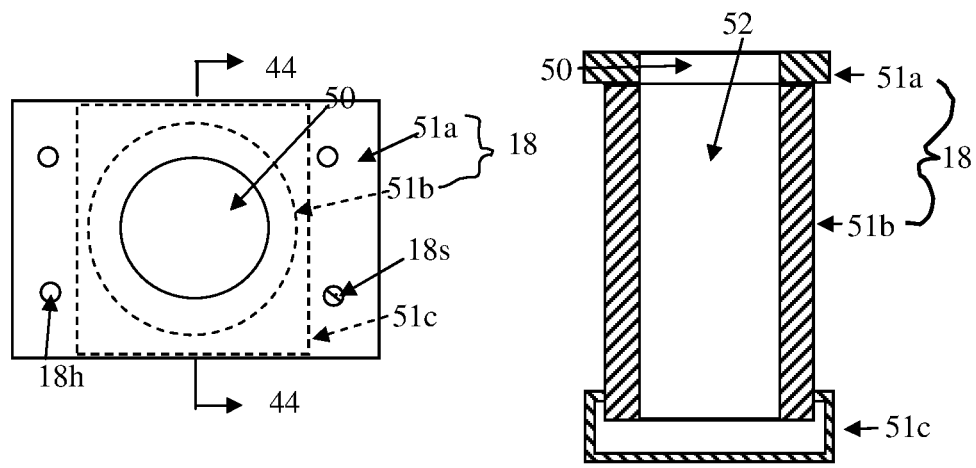
FIG. 43
FIG. 44

COOLER ASSEMBLY

CROSS REFERENCE TO RELATED APPLICATION

This application claims the benefit of U.S. Provisional Application No. 62/695,829, Cooler Assembly, filed Jul. 9, 2018 and incorporated herein.

BACKGROUND OF THE INVENTION

1. Field of the Invention

The present invention relates to a container assembly for converting a container into a mobile container with accessories. More specifically, the container assembly may have any of: a container body with or without a lid; one or more wheel assemblies each that may have an adjustable axis; a plurality of accessories (e.g., an accessory chair and a accessory table); one or more wheel assembly fastener devices (e.g., axle stud holders) for attaching the one or more wheel assemblies to the container body of the container; and the one or more accessory fastener devices (e.g., accessory fastener holder, also called accessory holders) for attaching or fastening the one or more accessories to the container body. The container may be a ice chest often referred to as a cooler. The cooler may be combined with the accessory fastener devices (e.g., accessory fastener holder, also called accessory holders) and one or more of the wheel assemblies using the wheel assembly fastener devices to form a cooler assembly. One the wheel assemblies may be attached near a one end (e.g., the front end) of the insulated body of the cooler and another one of the wheel assemblies may be attached near the other end (e.g., a back end) of the insulated body of the cooler using one or more of the wheel assembly fastener device (e.g., axle stud holders). The cooler with the one or more wheel assembly fastener devices may be used concurrently with or without the accessory fastener devices and any of the plurality of accessories. Each of the wheel assemblies may have an axle that is adjustable allowing the wheel assembly to be adjusted to fit different dimensioned containers or other platform based devices. The wheel assemblies may be easily removed from the cooler for transportation in a vehicle or for storage.

Many containers that have bottoms and sides sufficiently dimensioned to accept the accessory fastener devices and the wheel assembly fastener devices may be modified to form more flexible modified containers. The accessory fastener devices allow the modified containers to attach accessories such as those accessories providing seating and table space. The wheel assembly fastener devices allow the modified containers to attach wheel assemblies allowing the modified containers to be more easily moved on stable terrain.

Wheels and accessories, often fixed on the prior art mobile coolers, may make the coolers cumbersome and less flexible. For example, when the cooler is being moved to a storage locker or loaded in a vehicle it is often desirable to remove the wheels and accessories and then quickly reattach the wheels and accessories once the cooler is taken out of the vehicle or the storage locker. Additionally, it may be desirable to have a cooler with no wheels, a cooler with a single wheel, or a plurality of wheels in combinations of two, three, four, or five or more wheels. Further, the wheels may be integrated in wheel assemblies that may be capable of being attached to the cooler using the wheel assembly fastener devices and then easily removed and used for other purposes such being attached to other coolers, or attached to platforms to form dollies or trailers. Easily removable wheel assemblies may allow the platform or cooler to be pulled across difficult terrain, such as loose sand or mud, that may cause a wheeled container to get bogged down, and the wheels quickly reattached once the cooler or platform is on more suitable terrain. Additionally, accessories are often attached to prior art coolers using screws or nuts and bolts, making it difficult to quickly attach and detach the accessories to the cooler. The present invention may have one or a plurality of accessory fastener devices, also referred herein as accessory holders or accessory fastener holders, for quickly detaching and re-attaching one or more of the accessories (e.g., an accessory table and accessory chair) to the cooler.

The present invention is a container assembly (e.g., the cooler assembly). The container assembly may include one or more accessory fastener devices (e.g., accessory holders) for attaching one or more accessories (e.g., a accessory chair and accessory table) to a container body. The container assembly may further include one or more wheel assembly fastener devices (e.g., axle stud holders) for attaching one or more wheel assemblies each having one or more wheels. Still further, the container assembly may include the one or more wheel assemblies each having one or more wheels mounted on an axle that may have one or more an axle connectors (e.g., axle studs) disposed sized to fit in the one or more wheel assembly fastener devices (e.g., axle stud holders also called axle stud fastener devices). Also, the container assembly may include the container body (e.g., the insulated body of the cooler) of the container with or without a lid. Still further, the axle of the wheel assemblies may be adjustable allowing the wheels to be positioned under or outside the container body, and allowing the wheel assemblies to be integrated on other coolers or platforms by also integrating the assembly fastener devices (e.g., axle stud holders) and placing the one or more axle connectors (e.g., axle studs) in the wheel assembly fastener devices (e.g., axle stud holders) and securing them using an axle stud fastener device that may be the same as an accessory fastener using to secure the accessories to the accessory faster devices (i.e., accessory holders). In the one embodiment, the cooler assembly may comprise a wheel assembly that may be removable and attached to a bottom side wall of the insulated body near the back end, and may also comprise another wheel assembly attached near the front end of the insulated body. There may be one or more accessory fastener devices (i.e., accessory holders) that may be disposed around a top side wall of the container body (e.g., the insulated body of the cooler). The container assembly may also include a lid disposed sized to fit the container body. In another embodiment, the container assembly may comprise a platform (e.g., a bottom portion of the container body such as a bottom portion of the insulated body of the cooler) with the wheel assemblies mounted to the platform using the wheel assembly fastener devices. The one or more accessory fastener devices (i.e., accessory holders) may be disposed around on the platform or they may be placed in another the container body (e.g., the insulated body of the cooler) that may ride on the platform. The wheel assemblies in the one embodiment and the another embodiment may an adjustable axle allowing the wheel assembly to be fitted to a different dimensioned containers and platforms.

2. Description of the Prior Art

Container assemblies have been disclosed in the prior art such as: coolers having wheels fixed to the cooler; coolers with retractable wheels; cooler's with an adjustable axle requiring two or more adjustments; coolers with wheels and skis; coolers mounted on skis; coolers with an integrated table; coolers adapted to receive mounting pins for attachment of a wheel and axle assembly; external frame systems for mounting coolers or containers where the frame is bulky and requires an adjustment on each end of the frame to adjust the frame's axle; coolers with no accessory fastener devices; and coolers that have accessories, such as a table, where the accessory is often a part of the container and not capable of being easily removed and exchanged of another accessory. A more flexible cooler assembly would be useful. The flexible cooler assembly may have easily removable wheel assemblies attached to the cooler using wheel assembly fasteners that may be easily removed and used on other coolers or transporting devices. Additionally, the flexible cooler may also have accessory fastener devices for quickly attaching and detaching a variety of accessories to the cooler.

The container assemblies (i.e., coolers) disclosed in the prior art have several known drawbacks. They are limited in that: the wheels are not configured to be easily removed for storage or for transportation in a vehicle; the wheels are not on axles that are easily adjustable; or the wheels are not capable of being easily combined with other devices, such as a platform or another cooler, to form a new assembly. Also, the prior art coolers do not have accessory fastener devices (i.e., accessory holders) that are reusable allowing for the option of quickly attaching accessories to the container body (e.g., insulated body of the cooler), and then removing the accessory fastener devices for reuse on another container or platform. The present invention overcomes these limitations by disclosing: wheel assemblies that are removable and that are attached to the cooler using wheel assembly fastener devices (e.g., axle stud holders) that are reusable; wheel assemblies that have an adjustable axle that may allow the wheel assemblies to be used on different dimensioned coolers or platforms; and one or more accessory fastener devices (i.e., accessory holders) that are reusable and can quickly attach a variety of accessories to the cooler.

SUMMARY OF THE INVENTION

In view of the foregoing disadvantages inherent in the known types of the prior art coolers, the present invention provides a container assembly (e.g., cooler assembly) that may have accessory fastener devices (e.g., accessory fastener holders also called accessory holders) for attaching one or more accessories, and the container assembly may have one or more wheel assemblies attached to the cooler using wheel assembly fastener devices (e.g., axle stud holders) wherein the cooler can be utilized with or without the one or more of the wheel assemblies or accessory fastener devices. Additionally, the container (e.g., the cooler) may be mounted on a dolly or trailer formed by removing the wheel assemblies from the cooler and attaching them to another platform using the wheel assembly fastener devices removed from the container body. Additionally, each of the wheel assemblies may have an axle that is adjustable allowing each of the wheel assemblies to be used with a variety of wheel sizes, or on different dimensioned coolers, or to form dollies of varying dimensions configured to carry a container such as the cooler.

One object of the current invention is to provide container assembly (e.g., cooler assembly) that has many of the advantages of the prior art and none of the disadvantages.

Another object of the present invention is to provide a container assembly (e.g., the cooler assembly) with one or more removable wheel assemblies that may be used attached to the container body (e.g., insulated body of the cooler) or removed from the container body and attached to another cooler or a platform forming a dolly or trailer on which the container (e.g., the cooler) may be placed.

Yet another object of the present invention is to provide a container assembly having a plurality of accessory fastener devices for attaching accessory devices to the container (e.g., the cooler).

Still yet another object of the present invention is to provide a cooler assembly with removable wheel assemblies that may have an axles that is adjustable allowing for wheels of varying dimensions to be used on the axle and/or the wheels positioned under or outside of the container body.

Still yet further another object of the present invention is to provide a container assembly that allows for the use of accessory fasteners and wheel assembly fasteners that can quickly and easily secure and quickly release the accessories and the one or more wheel assemblies to the container body and then provide for the easy removal of the accessories and the one or more wheel assemblies.

Yet still yet another object of the present invention is to provide accessory fastener devices (e.g., accessory holders) and wheel assembly fastener devices (e.g., the axle stud holders) that may be easily removed and reused.

Other objects, features, and advantages of the present invention will become apparent from the following detailed description taken in conjunction with the accompanying drawings.

BRIEF DESCRIPTIONS OF THE DRAWINGS

Although the characteristic features of this invention will be particularly pointed out in the claims; the invention itself and manner in which it may be made and used may be better understood after a review of the following description, taken in connection with the accompanying drawings wherein the numeral annotations are provided throughout.

FIG. 10 shows a disassembled view of the one embodiment of the present invention looking from the first side wall.

FIG. 11 shows a sectional view along line 11-11 of FIG. 10.

FIG. 12 shows a section view along line 12-12 of FIG. 10.

FIG. 13 shows a sectional view along line 13-13 of FIG. 10.

FIG. 14 shows a sectional view along line 14-14 of FIG. 10.

FIG. 15 shows a side view of the axle of FIG. 10.

FIG. 16 shows sectional view along line 16-16 of FIG. 15.

FIG. 19 shows a side view of an accessory fastener, an axle stud holder, and a wheel assembly of the one embodiment of the present invention.

FIG. 20 shows a sectional view along line 20-20 of FIG. 19.

FIG. 21 shows a sectional view along line 21-21 of FIG. 19.

FIG. 22 shows a side view of an accessory fastener in the axle stud holder.

FIG. 23 shows a top view of an accessory holder of the one embodiment of the present invention.

FIG. 24 shows a sectional view along line 24-24 of FIG. 23.

Figure 36:
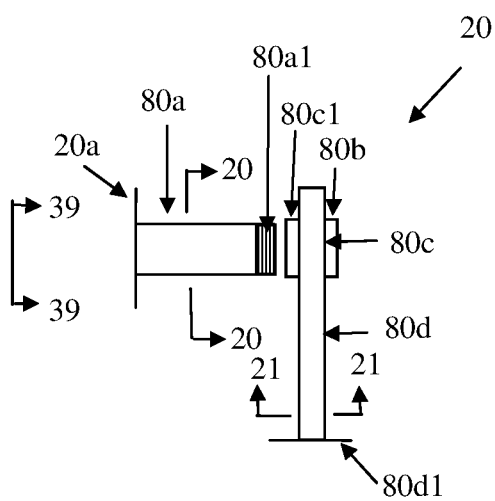

FIG. 36 side view the axle stud holder with the first portion externally threaded.

Figure 34:
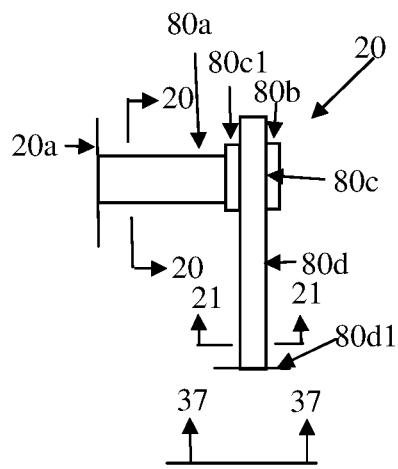
FIG. 34 is another side view of the axle stud holder.
Figure 37:
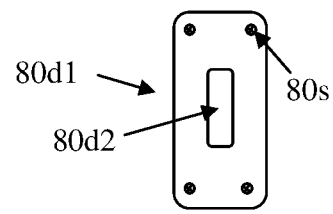

FIG. 37 shows a bottom view of a stud holder plate from line 37-37 of FIG. 34.

Figure 38:
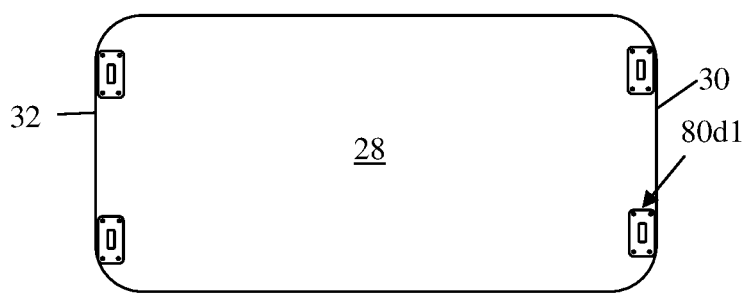

FIG. 38 shows the stud holder plates attached to the bottom side wall of the container.

Figure 39:
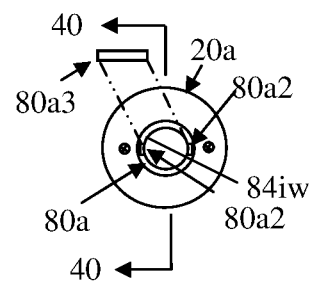

FIG. 39 shows front view of a fastener well plate view from line 39-39 of FIG. 36.

Figure 40:
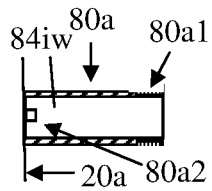

FIG. 40 shows a sectional view along line 40-40 of FIG. 39.

FIG. 41 shows another side view of the axle stud holder with a fastener well end cap.

FIG. 42 is a sectional view along line 42-42 of FIG. 41.

FIG. 43 shows a top view of an accessory fastener device and an accessory fastener well end cap.

FIG. 44 is a sectional view along line 44-44 of FIG. 43.

DETAILED DESCRIPTION OF THE INVENTION

References are made herein to the attached drawings. Like reference numerals are used throughout the drawings to depict like or similar elements of the container assembly that may be a cooler assembly. The figures are intended for representative purposes only and should not be considered to be limiting in any respect.

Figure 1:
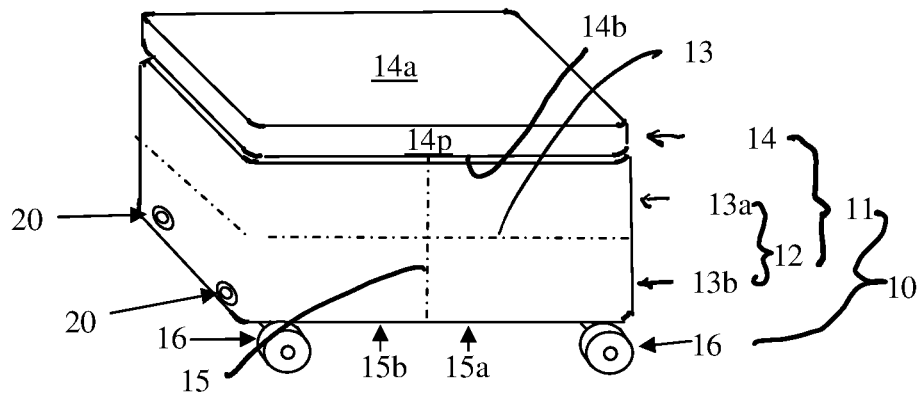
FIG. 1 shows a perspective view of one embodiment of the present invention.
Figure 2:
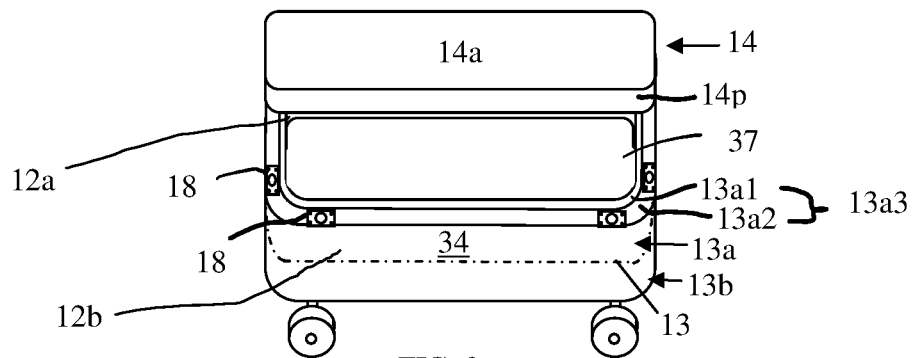
FIG. 2 shows a perspective view of the one embodiment of the present invention with the present invention tilted forward.
Figure 3:
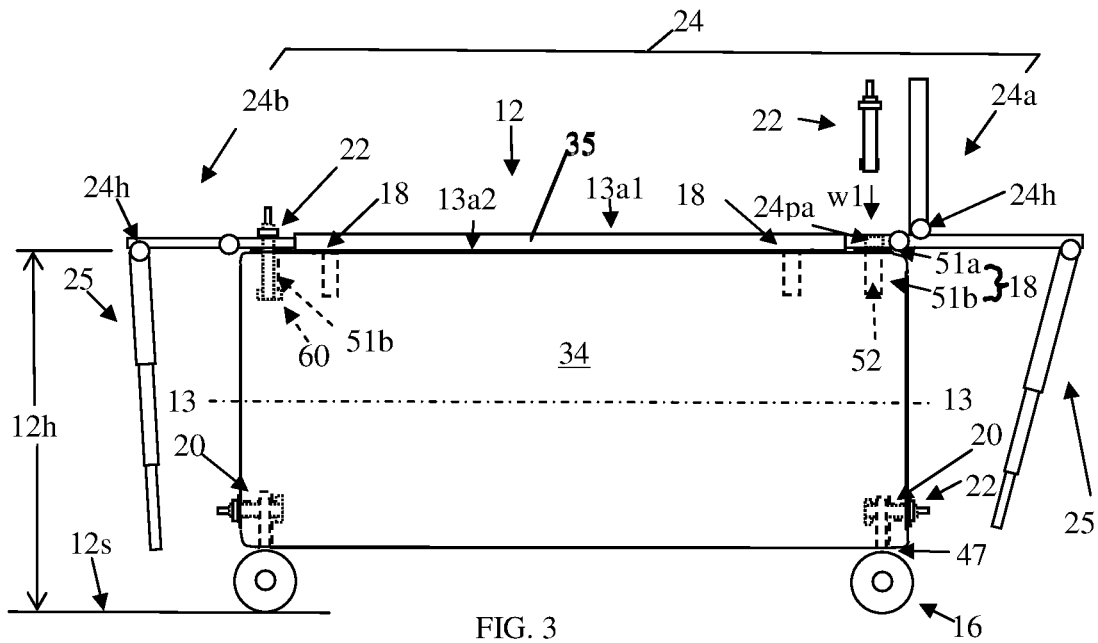
FIG. 3 shows a third side view of an insulated body of the one embodiment of the present invention showing an accessory chair and an accessory table.

Referring to FIG. 1, a container assembly (e.g., a cooler assembly 10) for holding and transporting materials that may be medical supplies, food and beverage items is presented. The container assembly (e.g., a cooler assembly) comprises: a container (e.g., a cooler 11) having container body (e.g., insulated body 12 of the cooler 11) with an open top portion above a horizontal plane 13 and bottom portion 13b below the horizontal plane 13; a lid 14 having a lid top 14a spaced from a lid bottom 14b defining a lid perimeter 14p; and two wheel assemblies 16. Referring to FIG. 2, the top portion 13a of the insulated body 12 is open and may have a top edge 13a1 running around the top portion 13a with a top side wall 13a2 surrounding the top edge 13a1. The top edge 13a1 and the top side wall 13a2 form a top cap 13a3, joining an inner surface 12a to an outer surface 12b of the insulated body 12. Between the inner surface 12a and the outer surface 12b of the insulated body 12 will be insulation that may be a vacuum, air, foam, or other commonly used insulators. Referring again to FIG. 1, the insulated body 12 also has a front portion 15a on one side of a vertical plane 15 and a back portion 15b on the other side of the vertical plane 15. The vertical plane 15 is substantially perpendicular to the horizontal plane 13. Referring to FIG. 2, there may be one or more accessory fastener devices (e.g., accessory holders 18) around the top edge 13a1 on the top side wall 13a2 of the insulated body 12. Referring to FIGS. 1 and 3, the insulated body 12 may also have one or more wheel assembly fastener devices (e.g., axle stud holders 20) around the bottom portion 13b of the cooler 11. The one or more accessory fastener devices (e.g., the accessory holders 18) and the wheel assembly fastener devices (e.g., the axle stud holders 20) may be configured and sized to hold an accessory fastener 22 that secures one or more accessories 24, such as an accessory chair 24a and an accessory table 24b, and the wheel assemblies 16 to the cooler 11.

Figure 4:
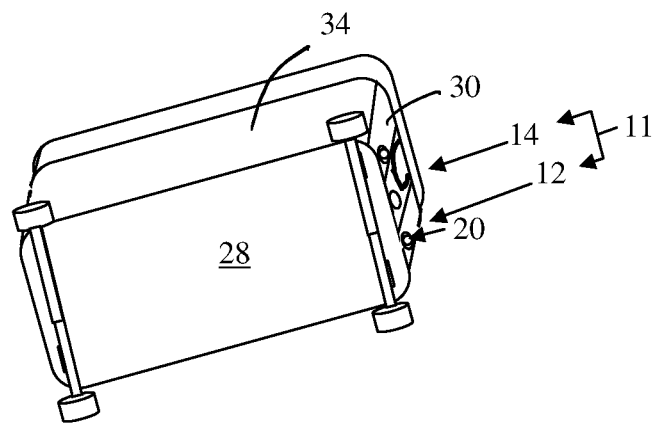
FIG. 4 shows a perspective view of the one embodiment of the present invention showing the bottom side wall and the first side wall.
Figure 5:
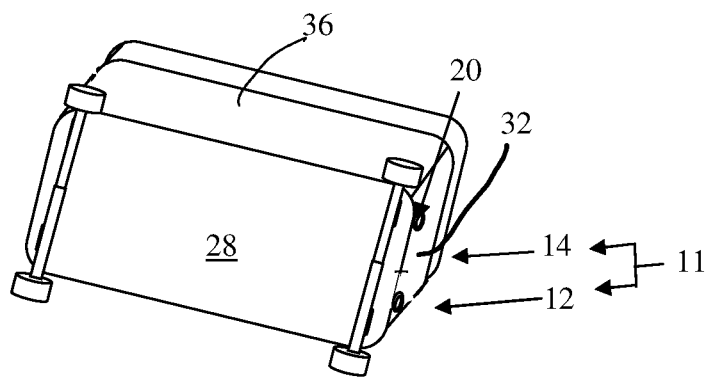
FIG. 5 shows a perspective view of the one embodiment of the present invention showing the bottom side and the second side wall.
Figure 6:
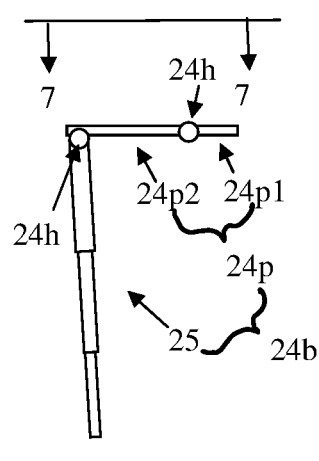
FIG. 6 is a third side wall view of the accessory table of FIG. 5.
Figure 7:
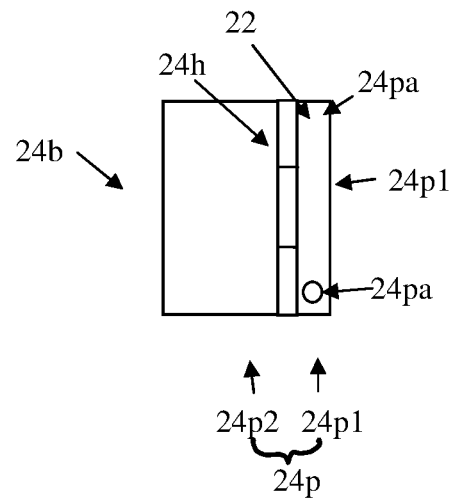
FIG. 7 is a top side wall view of the accessory table along line 7-7 of FIG. 5.
Figure 8:
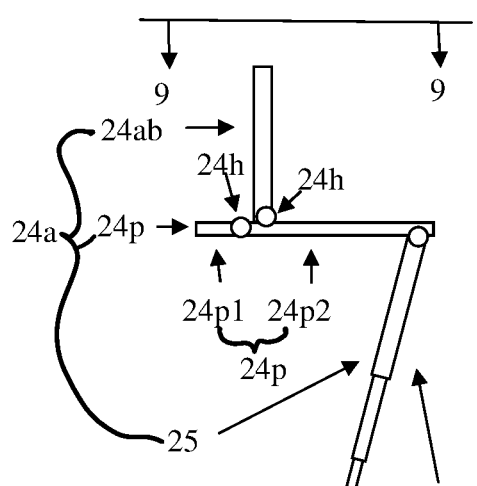
FIG. 8 is the third side wall view of the accessory chair of FIG. 5.
Figure 9:
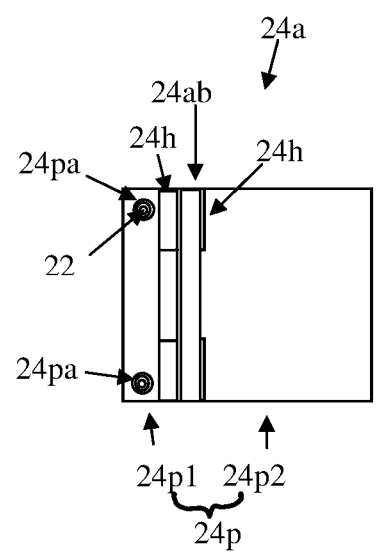
FIG. 9 is view of the accessory chair along line 9-9 of FIG. 8.

Referring to FIGS. 2, 4 and 5, the insulated body 12 further has a closed bottom side wall 28, a first side wall 30 opposite a second side wall 32, and a third side wall 34 opposite a fourth side wall 36, defining an inner compartment 37 that is also defined by the inner surface 12a of the insulated body 12. The inner surface 12a of the bottom side wall 28, the first side wall 30, the second side wall 32, the third side wall 34, and the fourth side wall 36 being opposite the outer surface 12b of the insulated body 12. The lid 14 is configured sized to fit the opening of the top portion 13a and may be configured to enclose the top edge 13a1 that may be raised by a top edge side wall 35 as shown in FIG. 3 and the lid 14 may rest on the top side wall 13a2. The first side wall 30 defines a front end (i.e., front) of the insulated body 12 and the second side wall 32 defines a back end (i.e., back) of the insulated body 12.

Referring to FIGS. 3, and 6-9, the accessories 24, such as the accessory chair 24a and the accessory table 24b, each may have an connecting portion 24p1 and a table-seat portion 24p2, the table-seat portion 24p2 may also serve as a table top. The connecting portion 24p1 may have one or more accessory apertures 24pa. The accessory apertures 24pa may be aligned with the accessory fastener devices (e.g., accessory holders 18), and one of the accessory fasteners 22 may be inserted through one of the accessory apertures 24pa into one of the accessory holders 18 to secure the connecting portion 24p1 to the insulated body 12 of the cooler 11. The connecting portion 24p1 and a table-seat portion 24p may be connected by a hinge 24h allowing the table-seat portion 24p2 to be folded. The accessory chair 24a may have a chair back 24ab attached to the table-seat portion 24p2 by another hinge 24h allowing the chair back 24ab to be folded against the table-seat portion 24p2. The table-seat portion 24p2 may have one or more legs 25 that may be telescopic, each of the legs 25 may be capable of extending at least a leg height 25h; the leg height 12h as measured from the top side wall 13a2 to a ground surface 12s; and the leg 25 may be connected a table-seat portion 24p2 by yet another hinge 24h. Cup holders (not shown) may be placed in the chair back 24ab allowing the cup holders to be used when the chair back 24ab is folded onto the table-seat portion 24p2.

Referring again to FIG. 4, the one embodiment of the present invention is shown comprising one of the wheel assemblies 16 disposed on the first side wall 30 and the bottom side wall 28. Referring again to FIG. 5, another of the wheel assemblies 16 disposed on the second side wall 32 and the bottom side wall 28.

Referring to FIG. 10, the lid 14 may have accessory fastener recesses 14r disposed in the lid bottom 14b. The accessory fastener recesses 14r are sized to cover each of the accessory fasteners 22 when the accessory fasteners 22 are in the accessory fastener devices 18 allowing the lid 14 to close against the top side wall 13a2. The first side wall 30 may include a handle 40h attached thereto. The first side wall 30 may include two mount points 40m each having a hollow interior 40c. The hollow interior 40c may have a circular cross section with a diameter 1 to 10 mm larger than the handle diameter. The handle 40h may be composed of any suitable material such as rope, plastic, wood, a polymer, steel, aluminum, or metal alloy. The handle 40h may have a handle first end 40e1 and a handle second end 40e2. The handle first end 40e1 and the handle second end 40e2 having substantially equivalent cross sections and located on opposite ends of the handle 40h. The handle first end 40e1 is configured to fit in one mounting point 40m and the handle second end 40e2 in the other mounting point 40m so that the handle 40h can freely rotate therein. A hand grip 40g may be attached to the handle 40h.

Continuing to refer to FIG. 10, a disassembled view of the one embodiment of the present invention as viewed from the first side wall 30, each of the wheel assemblies 16 may comprise two wheels 45 mounted on an axle 46 having two axle studs 47. Each of the axle studs 47 extends from the axle 46 and may be substantially perpendicular to the axle 46. Additionally, the wheels 45 may extend beyond the third side wall 34 and the fourth side wall 36 allowing for wheels 45 of varying diameters to be used. Continuing to refer to FIG. 10, the axle 46 may be an elongated element that may have a first axle element 42 that is hollow as shown in FIG. 11 and a second axle element 43 that is hollow as shown in FIG. 12. The first axle element 42 and the second axle element 43 may be internally threaded to allow the wheels 45 to be attached with an axle bolt 46b. Referring to FIG. 13, a sectional view along line 13-13 of FIG. 10, the axle bolt 46b is inserted through a wheel aperture 45a into the axle 46 shown in FIG. 10 to secure the wheels 45 to the axle 46. Referring to FIG. 14, a sectional view of the axle stud 47 along line 14-14 of FIG. 10, the axle stud 47 may have an axle stud first face 47b and an axle stud second face 47c. Referring to FIG. 15 the axle 46 may have an axle first end 46e1 and an axle second end 46e2. Referring to FIG. 15, the axle stud 47 may be rectangular and may have: a stud length 47L extending 50-75 mm from the axle axis 46a and a stud width 47w of 25-50 mm. Referring to FIG. 14 the axe stud 47 may have an axle stud thickness 47t of 5 mm to 10 mm as measured from the axle stud first face 47b to the axle stud second face 47c. Referring to FIGS. 15 and 16, the second axle element 43 may be inserted into the first axle element 42 and secured with an axle fastener 49p that may be: a connecting bolt and connecting nut, a pin, or a push pin fastener that is inserted through a first element hole 49 of the first axle element 42 and through a second element hole 49a of the second axle element 43.

Figure 17:
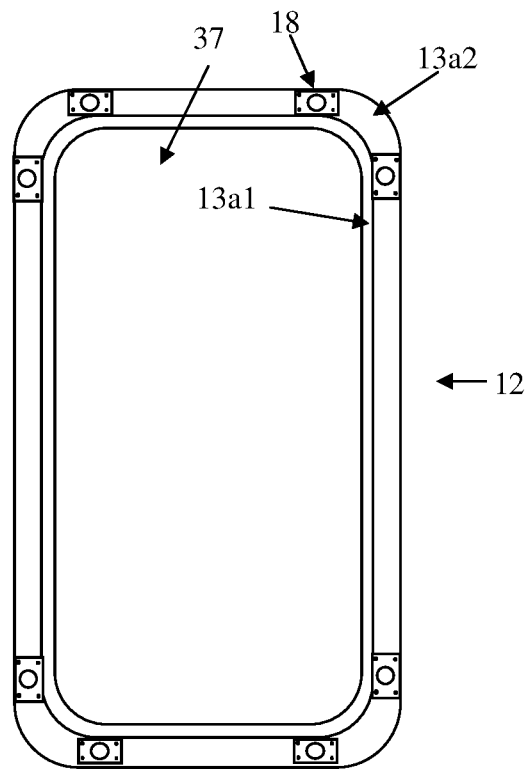
FIG. 17 shows a top side wall view of the body of the one embodiment of the present invention.
Figure 18:
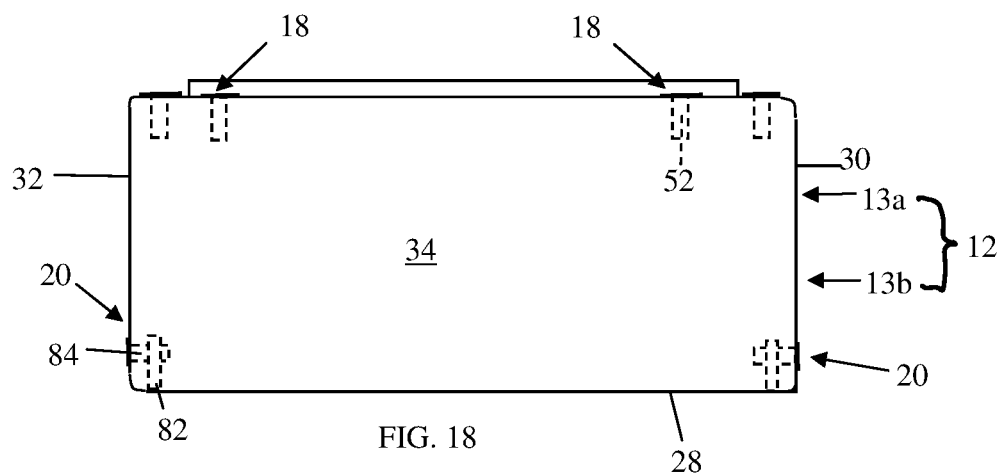
FIG. 18 shows a third side wall view of the insulated body of the one embodiment of the present invention.

Referring to FIG. 17, a top view of the insulated body is shown with the accessory fastener devices 18 positioned around the top edge 13a1 on the top side wall 13a2. Referring to FIG. 18, a third side wall 34 view of the insulated body 12 is shown with the accessory fastener devices 18 and the axle stud holders 20. Referring to FIGS. 19-21, the axle stud holder 20 may comprise a first portion 80a, a second portion (i.e., locking hold portion) 80b, a third portion (stud well connect portion) 80c and a fourth portion (i.e., stud well connect extension portion) 80d. The axle stud holder 20 may have an axle stud well 82 disposed and sized for one of the axle studs 47 and an axle stud fastener well 84 disposed and sized for one of the accessory fasteners 22. The axle stud aperture 47a may have an axle stud aperture diameter 47ad between 15-30 mm with the axle stud fastener well 84 having an axle stud fastener well inner diameter 84id at least equal to the axle stud aperture diameter 47ad. One of the axle stud fasteners, that may be one of the accessory fasteners 22, is configured sized to slide through the axle stud fastener well 84 of a first portion 80a, then through the axle stud aperture 47a of a third portion, and then through axle stud fastener well 84 of a second portion 80b securing the axle stud 47 in the axle stud holder 20 as shown in FIG. 22. Referring again to FIGS. 19-21, the axle stud well 82 disposed and sized to receive one of the axle studs 47 and the axle stud fastener well 84 disposed and sized to receive one of the accessory fasteners 22. The axle stud aperture 47a may have an axle stud aperture diameter 47ad between 15-30 mm with the axle stud fastener well 84 having an axle stud fastener well inner diameter 84id at least equal to the axle stud aperture diameter 47ad. One of the axle stud fasteners, that may be one of the accessory fasteners 22, is configured sized to slide through the axle stud fastener well 84 of the first portion 80a, then through the axle stud aperture 47a of the third portion, and then through axle stud fastener well 84 of the second portion 80b securing the axle stud 47 in the axle stud holder 20 as shown in FIG. 22.

Referring to FIGS. 3, 23, and 24, the accessory fastener devices 18 each having an accessory fastener well 52 configured to hold an accessory fastener 22. The accessory fastener device 18 each a plate portion 51a and a well portion 51b; the well portion 51b extending from the plate portion 51a; the plate portion 51a may be rectangular, elliptical, or other geometric shape and has an plate aperture 50 that is part of an accessory fastener well 52 extending through the plate portion 51a into the well portion 51b. The well portion 51b may be cylindrically shaped and is hollow.

Referring to FIG. 19, the accessory fasteners 22 each may have; a push pin 56 running through a housing 58; a locking element 60 configured to lock the accessory fastener 22 in the accessory fastener well 52; and a stop 54 configured to stop the accessory fastener 22 at the plate portion 51a. The push pin 56 is configured with a spring (not shown) inside the housing 58. Pushing the push pin 56 compresses the spring 56a retracting the locking element 60 into the housing 58; releasing pressure on the push pin 56 decompresses the spring (not shown) and allows the locking element 60 to move outside the housing 58. Referring to FIG. 19 and FIG. 20, a sectional view of the first portion 80a of one of the axle stud holders 20, the axle stud holders 20 are configured to accept the accessory fastener 22 into the axle stud fastener well 84 that extends though the first portion 80a, the third portion (stud well connect portion) 80c and the second portion (i.e., locking hold portion) 80b of the axle stud holder of FIG. 20. Likewise, referring to FIG. 80, a sectional view of the fourth portion (i.e., stud well connect extension portion) 80d of the axle stud holder 20, the axle stud holders 20 are configured to accept the axle stud 47 into the axle stud well 82 that extends into the third portion 80c of the axle stud holder of FIGS. 19 and 20. The accessory fastener 22 may be is inserted, with the locking element 60 retracted as shown in FIG. 19, into the axle stud holder 20 along fastener path w1 into the axle stud fastener well 84 and through the axle stud aperture 47a of the axle stud 47 that has been inserted along stud path w2 up into the third portion 80c, and then the locking element 60 placed through the second portion 80b until the locking element 60 is beyond the second portion 80b and no longer retracted, meaning released, to secure the axle stud 47 in the axle stud holder 20 as shown in FIG. 22. Additionally, the second portion 80b may also be internally threaded to accept a fastener bolt (not shown) configured to screw into the second portion 80b holding the axle stud 47 in the axle stud holder 20. The axle stud holder 20 may comprise only the first portion 80a, the third portion (i.e., stud well connect portion) 80c and the fourth portion (i.e., stud well connect extension portion) 80d.

Referring to FIGS. 3, and 6-9, each of the accessories 24 may have the accessory aperture 24pa that may be the diameter of the accessory fastener well 52 allowing for each of the accessories 24 to be attached to the insulated body 12 by aligning the accessory aperture 24pa with the accessory fastener well 52, and inserting the accessory fastener 22 with the locking element retracted through the accessory aperture 24pa into and through the well portion 51b and the releasing pressure on the push pin 56 allowing the locking element 60 to extend beyond the well portion 51b of the accessory fastener securing the accessory, such as the accessory chair 24a, to the insulated body 12. Alternatively, well portion 51b may be internally threaded at least on the well portion end opposite the plate portion 51a so that the accessory, such as accessory chair 22b may the secured to the accessory fastener device 18 with a fastener bolt (not shown), the threaded end of the bolt screwed into the well portion 51b that may be internally threaded with a head of the bolt extending at least beyond the accessory aperture 22pa securing the accessory to the accessory fastener device 18.

Figure 25:
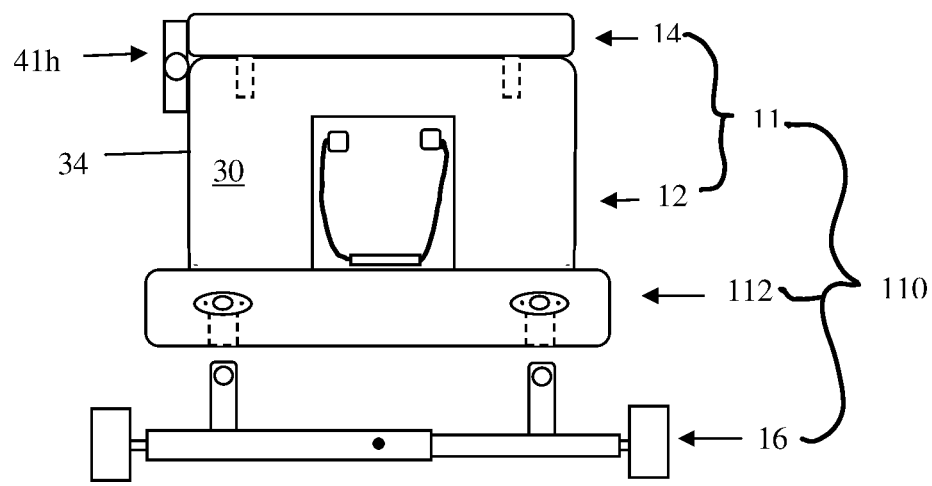
FIG. 25 shows a first end view of a platform and wheel assembly of another embodiment of the present invention.
Figure 26:
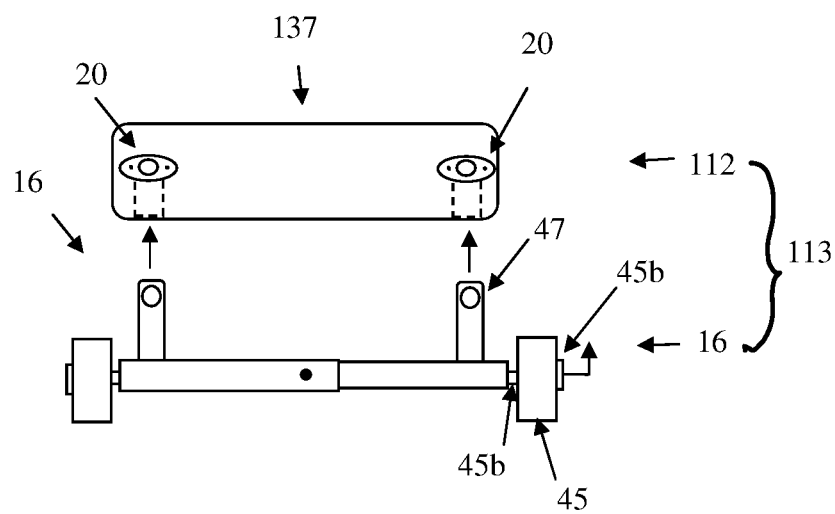
FIG. 26 shows a first end view of the another embodiment of the present invention.
Figure 27:
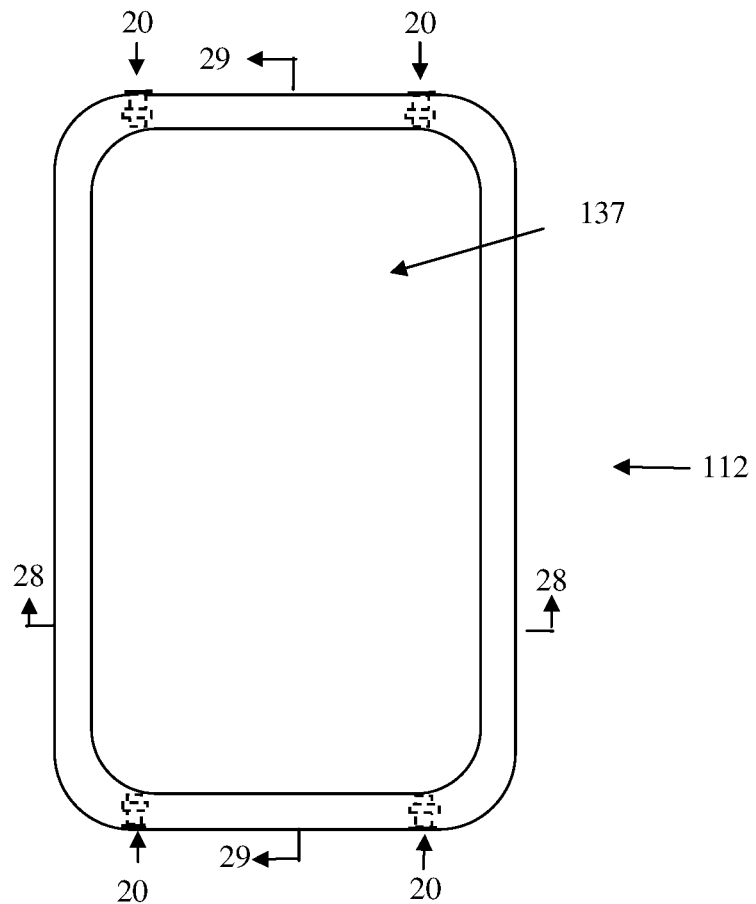
FIG. 27 shows a top view of the platform of the another embodiment of the present invention.
Figure 28:
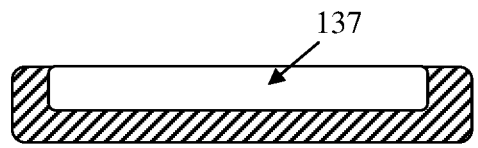
FIG. 28 shows a sectional view along line 28-28 of FIG. 27.
Figure 29:
FIG. 29 shows a sectional view along line 28-28 of FIG. 27.

Referring now to FIG. 25, the flexibility of the present invention is demonstrated another embodiment 110 with the axle stud holders 20 integrated in a platform 112 or another cooler (not shown) having dimensions to accept the axle stud holders 20. For demonstration purposes the platform 112 is similar to bottom portion 13b of the insulated body 12 of the cooler 11 of FIG. 1. This enables one of the wheel assemblies 16 of the one embodiment to be attached to the platform 112. The axle 46 being adjustable may allow the wheel assembly 16 to be used with coolers of varying dimensions (not shown); or used with the platform 112 to form a dolly 113 as shown in FIG. 26. Referring again to FIGS. 25, 26 and 27, the platform 112 may have a center part 137 shown in FIGS. 26, 27, and 28 configured to hold the bottom portion 13b of the insulated body 12 shown in FIGS. 1 and 2. FIG. 28 shows a sectional view along line 28-28 of FIG. 27 and FIG. 29 shows a sectional view along line 29-29 of FIG. 27. FIG. 25 shows the cooler 11 fitted with a cooler hinge 41h.

Figure 30:
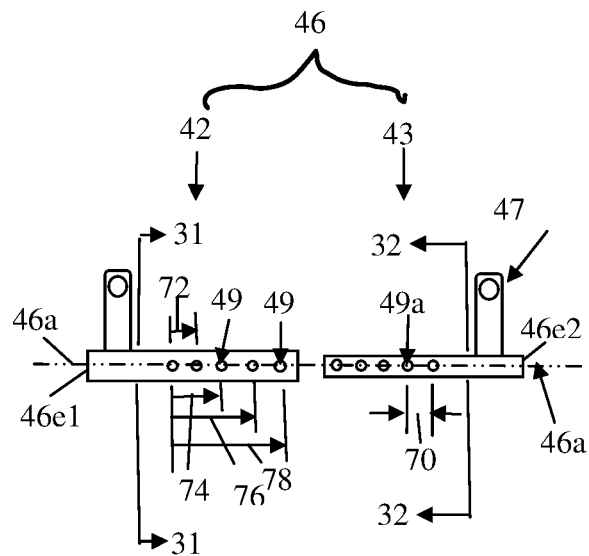
FIG. 30 is a side view of the first and second axle elements of the axle.
Figure 31:
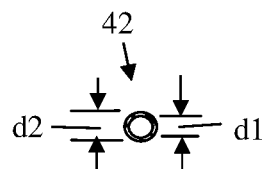
FIG. 31 shows a sectional view along line 31-31 of FIG. 30.
Figure 32:
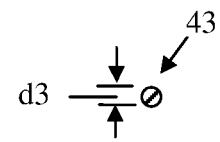
FIG. 32 shows a sectional view along line 32-32 of FIG. 30.
Figure 33:
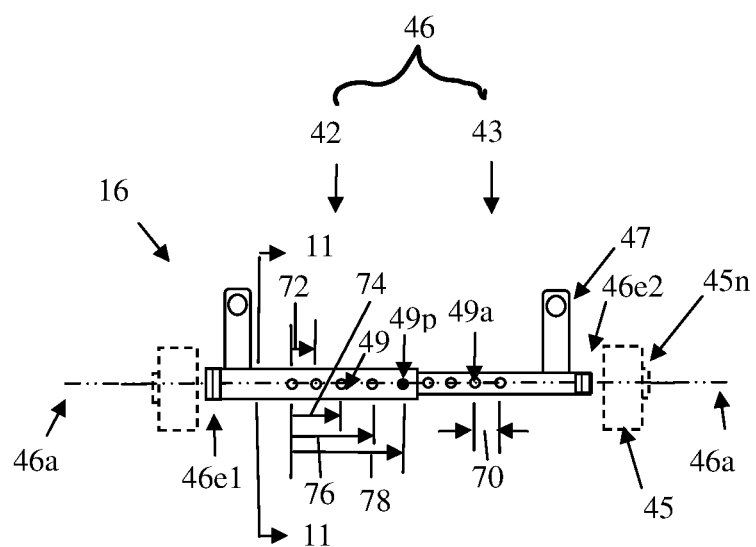
FIG. 33 is a side view the second axle element inserted in the first axle element.

Referring again to FIGS. 15 and 16, and FIG. 30 the second axle element 43 may be configured sized to slide into the first axle element 42 that may be hollow and secured using the axle fastener 49p. The axle fastener 49p may slide thought a first element hole 49 that is aligned with a second element hole 49a of the second axle element 43 securing the first axle element 42 and second axle element 43 together. The axle fastener 49p may be a quick-release pin commonly available at vendors like McMaster-Carr. The first axle element 42 may have one, two, or three or more of the first element holes 49 linearly arranged on a first line of arrangement with each of the first element holes 49 running through the axle axis 46a and at varying distances from each other. The second axle element 43 may have each of the second element holes 49a equally spaced a set distance 70 one from the other, or the second element holes 49a may unequally spaced (not shown) one from the other. The second axle element 43 may have only one second element hole 49a, or may have two or more of the second element holes arranged linearly parallel to the axle axis 46a with each of the second element holes 49a running through the axle axis 46a. Referring to FIG. 30 and the first axle element 42, there may be five first element holes 49. Measuring from a number one first element hole 49 nearer the axle stud 47, the number one first element hole 49 may be a first distance 72 from a second first element hole 49, a second distance 74 from a third first element hole 49, a third distance 76 from a fourth first element hole 49, and a fourth distance 78 from a fifth first element hole 49. Each of the first element holes 49 may be spaced one from another so that no distances between any other first axle element hole are equal allowing for a broader range of axle lengths that if any distance between two first axle element holes were equal to any other distance between two first element holes 49. For example, for the second axle element, the set distance 70 may be 15-35 mm. For the first axle element the first distance 72 may be 23 mm, the second distance may be 52 mm, the third distance may be 83 mm, and the fourth distance may be 114 mm. For the five first element holes 49 shown in FIG. 15 and FIG. 30 and each of the second element holes 49a there are five axle lengths when the axle fastener 49p placed through each of the first element holes 49 and one of the second element holes 49a aligned with one of the first element holes 49. Referring to FIG. 31, each of the first element holes 49 may be cylindrical and may have a first axle element inner diameter d1 of 15-40 mm and a first axle element outer diameter d2 of 15-60 mm. Referring to FIG. 32, the second axle element 43 may have a second axle element outer diameter d3 of 14-39 mm. Where the second axle element 43 is hollow, the second axle element 43 may have a second axle element inner diameter d4 shown in FIG. 12 between 11-36 mm. Additionally, instead of the axle first end 45e1 and the axle second end 45e2 of FIG. 15 being internally threaded, looking to FIG. 33 the first axle element 42 and the second axle element 43 may have an externally threaded axle first end 45e1 and axle second end 45e2, respectively, with each of the wheels 45 secured to the axle with an axle nut 45n.

Figure 35:
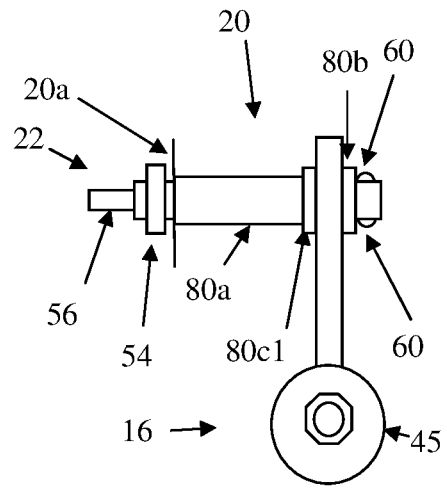
FIG. 35 is another side view of the axle stud holder with the accessory fastener inserted and holding the wheel assembly.

Referring to FIG. 34, another side view of the axle stud holder 20 of FIG. 19 is shown with the addition of a stud holder plate 80d1. FIG. 35 is another view of the axle stud holder 20 with the wheel assembly 16 inserted. Referring to FIG. 36, the first portion 80a may have a first portion end 80a1 that may be externally threaded and configured sized to screw into a third portion sleeve 80c1 (i.e., a stud well connect sleeve) of the third portion 80c (i.e., the stud well connect portion) that is internally threaded. Although not shown, the third portion may be internally threaded without the third portion sleeve 80c1 allowing the first portion end 80a1 to be connected to the third portion 80c. The first portion end 80a1 is configured to align with the axle stud aperture 47a of FIGS. 10, 15, 30, and 33 so that the accessory fastener 22 may be inserted in the axle stud fastener well 84 shown in FIG. 19 and through the axle stud aperture 47a shown in FIGS. 10, 15, 30, and 33 when each of the wheel assemblies 16 is attached to the insulated body 12 as shown in FIG. 3. Referring again to FIG. 34 and to FIG. 37, the stud holder plate 80d1 may have a stud holder cutout 80d2 disposed sized for the axle stud 47 to slide through. Referring to FIG. 36, the stud holder plate 80d1 may be welded to the fourth portion 80d of the axle stud holder 20, and referring to FIG. 38, may be attached to the bottom side wall 28 of the insulated body 12 of the cooler 11 of FIGS. 4-5 using plate screws 80s shown in FIG. 37. Referring to FIG. 38, two stud holder plates 80d1 are shown positioned on the bottom side wall 28 near the first side wall 30 and two more on the bottom side wall 28 near second side wall 32.

Looking to FIGS. 39-40 a front view of the fastener well front plate 20a of FIG. 36 is shown. The first portion 80a of the axle stud holder 20 may have two notches 80a2 disposed along the fastener well inner wall 84iw opposite each other that may be used to turn the first portion 80a screwing the first portion 80a into the third portion sleeve 80c1. A turn bar 80c3 or rod configured sized to fit into the notches 80a2 may be used to turn the first portion 80a while screwing the first portion 80a into the third portion sleeve 80c1.

Referring to FIGS. 41 and 42, the axle stud holder 20 may have a fastener well end cap 80b1. The fastener well end cap 80b1 may surround and cover the second portion 80b and may be attached to the third portion 80c preventing insulation or other debris from entering the axle stud fastener well 84 and adhering to a fastener well inner wall 84iw of the axle stud holder 20 or entering the axle stud well 82 and adhering to the stud well inner wall 82iw. The fastener well end cap 80b1 of FIG. 42 may be configured sized to hold the locking element 60 of an accessory fastener 22 shown in FIGS. 19-22 and FIG. 35 when the locking element 60 is securing the accessory fastener 22 in the axle stud fastener well 84 of the axle stud holder 20. The fastener well end cap 80b1 and the second portion 80b may form a single unit. Also, the first portion end 80a1 or the second portion 80b may be internally threaded and sized for yet another accessory fastener 22 that may be another bolt (not shown). The Referring to FIGS. 43 and 44, any one of the accessory fastener devices 18 of FIGS. 3, 23, and 24 may have added to it an accessory fastener well end cap 51c allowing the accessory fastener device 18 to be inserted in the insulated body 12 (see FIGS. 2 and 3) without insulation or debris from the insulated body 12 entering the well portion 51b. The accessory fastener well end cap 51c of FIG. 44 may be configured sized to hold the locking element 60 of an accessory fastener 22 when the locking element 60 shown in FIG. 3 is securing the accessory fastener 22 in the well portion 51b of the accessory fastener device 18. The accessory fastener 22 may be another quick-release pin commonly available at vendors like McMaster-Carr. The well portion 51b may be internally threaded to accept still another accessory fastener 22 that may be yet another bolt.

It is therefore submitted that the present invention has been shown and described in several embodiments. It is recognized that departures may be made within the scope of the invention and that obvious modifications will occur to a person skilled in the art. For example, instead of a cooler (i.e., a container) 11 with an insulated body (i.e., a container body) 12 shown in FIGS. 1, 2, and 3, any container or platform may be adapted to install one or more of the axle stud holders 20 and or one or more of the accessory fastener devices 18 provided the container or the platform has device side walls sized to allow the axle stud holders 20 and the accessory fastener devices 18 to be inserted. With respect to the above descriptions then, it is to be realized that the optimum dimensional relationships for the parts of the invention, to include variations in size, materials, shape, form, function, and manner of operation, assembly and use, are deemed readily apparent and obvious to one skilled in the art, and all equivalent relationships to those illustrated in the drawings and described in the specifications are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A container assembly comprising at least a first axle stud holder, the first axle stud holder comprising at least a first portion, a stud well connect portion and a stud well connect extension portion; the first axle stud holder having an axle stud well and an axle stud fastener well; the axle stud well disposed sized to receive an axle stud; and the axle stud fastener well disposed sized to receive an axle stud fastener; and the axle stud fastener well sized for an axle stud fastener to fit through an axle stud aperture of the axle stud when the axle stud is disposed in the axle stud well; and the axle stud well running disposed in the stud well connect portion and the stud well connect extension portion; and the stud well connect portion mounted transverse to the first portion; and the axle stud fastener well running through the first portion and a stud well connect portion allowing the axle stud fastener to fit through the first portion, through the axle stud aperture of the axle stud when the axle stud is disposed in the axle stud well and thorough the stud well connect portion with a locking element of the axle stud fastener located outside the stud well connect portion.

2. The container assembly of claim 1 wherein at least the first axle stud holder has a fastener well end cap disposed adjacent to the stud well connect portion; and the fastener well end cap disposed sized to surround the locking element of the axle stud fastener when the axle stud is disposed in the axle stud well and thorough the stud well connect portion with a locking element of the axle stud fastener located outside the stud well connect portion.

3. The container assembly of claim 1 further comprising one or more wheel assemblies each having one or more wheels mounted on an axle having one or more axle studs; each of the axle studs extending from the axle; the axle having a first axle element and a second axle element; the second axle element configured sized to slide into the axle first element; and the first axle element secured to the second axle element using an axle fastener.

4. The container assembly of claim 3 wherein the axle fastener is disposed sized to slide though one or more first element holes that is aligned with one or more second element holes of the second axle element securing the first axle element and second axle element together; the first axle element has three or more of the first element holes linearly arranged on a first line of arrangement with each of the first element holes running through an axle axis and at varying distances from each other; and the second axle element having three or more second element holes equally spaced from any other adjacent second element hole.

5. A container assembly of claim 1 further comprising one or more accessory fastener devices; each of the one or more accessory fastener devices having an accessory fastener well disposed sized to hold an accessory fastener; the one or more accessory fastener devices each disposed sized to hold the accessory fastener that secures one or more accessories to a container; the accessory fastener devices having a plate portion and a well portion; the well portion transverse to the plate portion; the plate portion having a plate aperture; and the well portion being hollow with the accessory fastener well comprising the plate aperture and the well portion.

6. The container assembly of claim 5 further comprising an accessory table; the accessory table having a connecting portion and a table-seat portion; the connecting portion having an accessory aperture; the accessory aperture configured to align with the accessory fastener well of any of the one or more accessory fastener devices; the accessory fastener inserted through the accessory aperture into any of the accessory fastener devices to secure the connecting portion; the connecting portion and a table-seat portion connected by a hinge; and the table-seat portion having one or more legs each being telescopic, each of the legs connected a table-seat portion by another hinge.

7. The container assembly of claim 5 further comprising an accessory chair; the accessory chair having a connecting portion, a table-seat portion and a chair back; the connecting portion having an accessory aperture, the accessory aperture configured to align with the accessory fastener well of any of the one or more accessory fastener devices; the accessory fastener inserted through the accessory aperture into any of the accessory fastener devices to secure the connecting portion; the connecting portion and a table-seat portion connected by a hinge; the chair back attached to the table-seat portion by another hinge allowing the chair back to be folded against the table-seat portion; and the table-seat portion having one or more legs each being telescopic, each of the legs connected to the table-seat portion by yet another hinge.

8. The container assembly of claim 5 wherein at least one of the accessory fastener devices has an accessory fastener well end cap added to an end of the well portion that is not adjacent to the plate portion.

9. A container assembly comprising at least a first axle stud holder; the first axle stud holder having an axle stud well and an axle stud fastener well; the axle stud well disposed sized to receive an axle stud; and the axle stud fastener well disposed sized to receive an axle stud fastener; the axle stud fastener well in a first portion; the axle stud well in a stud well connect extension portion and a stud well connect portion; and the first portion capable of separating from the stud well connect extension portion and the stud well connect portion.

10. The container assembly of claim 9 wherein at least the first axle stud holder has a fastener well end cap disposed sized to surround and cover a locking element of the axle stud fastener when the axle stud fastener is disposed in the axle stud well.

11. The container assembly of claim 9 wherein at least the first axle stud holder has at least two notches disposed on a fastener well inner wall opposite each other; and the two notches disposed sized to receive a turn bar.

12. The container assembly of claim 11 wherein at least the first axle stud holder has a first portion end; and the first portion end configured sized to connect to a stud well connect sleeve connecting the axle stud well to the axle stud fastener well.

13. The container assembly of claim 9 wherein at least the first axle stud holder further comprises at least a first portion, a stud well connect portion and a stud well connect extension portion; the axle stud fastener disposed sized to fit through an axle stud aperture of the axle stud when the axle stud is disposed in the axle stud well; and the axle stud well running disposed in the stud well connect portion and the stud well connect extension portion; and the stud well connect portion mounted transverse to the first portion; and the axle stud fastener well running through the first portion allowing the axle stud fastener to fit through the first portion, through the axle stud aperture of the axle stud when the axle stud is disposed in the axle stud well and thorough the stud well connect portion with a locking element of the axle stud fastener located outside the stud well connect portion.

14. The container assembly of claim 13 wherein the first portion of at least the first axle stud holder has a first portion end; and the first portion end configured sized to connect to a stud well connect sleeve of the stud well connect portion.

15. The container assembly of claim 14 wherein at least the first portion of the first axle stud holder has at least two notches disposed on a fastener well inner wall opposite each other; and the two notches disposed sized to receive a turn bar.

16. The container assembly of claim 13 further comprising one or more wheel assemblies each having one or more wheels mounted on an axle having one or more axle studs; each of the axle studs extending from the axle; the axle having an first axle element and a second axle element; the second axle element configured sized to slide into the axle first element; and the first axle element secured to the second axle element using an axle fastener.

17. The container assembly of claim 16 wherein the axle fastener is disposed sized to slide though one or more first element holes that is aligned with one or more second element holes of the second axle element securing the first axle element and second axle element together; the first axle element has three or more of the first element holes linearly arranged on a first line of arrangement with each of the first element holes running through an axle axis and at varying distances from each other; and the second axle element having three or more second element holes equally spaced from any other adjacent second element hole.

18. The container assembly of claim 17 where in the first element holes that are linearly arranged and wherein the second element holes are linearly arranged.

19. The container assembly of claim 18 further comprising a container body; the container body having an inner compartment defined by a bottom side wall and side walls extending upwardly there from; the side walls comprising a first side wall, a second side wall, a third side wall, and a fourth side; the first side wall opposite the second side wall, and the third side wall opposite the fourth side wall; and one or more accessory fastener devices located on a top side wall running around a top edge that runs around the inner compartment.

20. The container assembly of claim 19 wherein a back portion of said container body further comprises the first axle stud holder and a second axle stud holder, and the second axle stud holder each being substantially equivalent to the first axle stud holder.

21. The container assembly of claim 20 wherein a front portion of said container body further comprises a third axle stud holder and a fourth axle stud holder, and the third axle stud holder and the fourth axle stud holder each being substantially equivalent to the first axle stud holder.

22. The container assembly of claim 16 further comprising: one or more accessory fastener devices; each of the one or more accessory fastener devices having an accessory fastener well disposed sized to hold an accessory fastener; the one or more accessory fastener devices each disposed sized to hold the accessory fastener that secures one or more accessories to a container; the accessory fastener devices having a plate portion and a well portion; the well portion transverse to the plate portion; the plate portion having a plate aperture; and the well portion being hollow with the accessory fastener well comprising the plate aperture and the well portion.

23. The container assembly of claim 22 further comprising an accessory table; the accessory table having a connecting portion and a table-seat portion; the connecting portion having an accessory aperture; the accessory aperture configured to align with the accessory fastener well of any of the one or more accessory fastener devices; the accessory fastener inserted through the accessory aperture into any of the accessory fastener devices to secure the connecting portion; the connecting portion and a table-seat portion connected by a hinge; and the table-seat portion having one or more legs each being telescopic, each of the legs connected a table-seat portion by another hinge.

24. The container assembly of claim 22 further comprising an accessory chair; the accessory chair having a connecting portion, a table-seat portion and a chair back; the connecting portion having an accessory aperture, the accessory aperture configured to align with the accessory fastener well of any of the one or more accessory fastener devices; the accessory fastener inserted through the accessory aperture into any of the accessory fastener devices to secure the connecting portion; the connecting portion and a table-seat portion connected by a hinge; the chair back attached to the table-seat portion by another hinge allowing the chair back to be folded against the table-seat portion; and the table-seat portion having one or more legs each being telescopic, each of the legs connected to the table-seat portion by yet another hinge.

25. A container assembly comprising at least one axle stud holder; and each of the axle stud holders having an axle stud well and an axle stud fastener well; the axle stud fastener well in a first portion; the axle stud well in a stud well connect extension portion and a stud well connect portion; and the first portion capable of separating from the stud well connect extension portion and the stud well connect portion.

26. The container assembly of claim 25 further comprising one or more of accessory fastener devices, one or more of the wheel assemblies, and a container body; the container body having an inner compartment defined by a bottom side wall and side walls extending upwardly there from; the side walls comprising a first side wall, a second side wall, a third side wall, and a fourth side; the first side wall opposite the second side wall, and the third side wall opposite the fourth side wall; and one or more of the accessory fastener devices located on a top side wall running around a top edge that runs around the inner compartment; and one or more of the axle stud holders around the bottom wall; one or more of wheel assemblies each having one or more axle studs; and one or more of the wheel assemblies connected to the container body by one or more of the axle studs inserted into one or more of the axle stud holders and secured by one or more axle stud fasteners.

27. The container assembly of claim 25 further comprising at least one accessory fastener device, wherein at least one or more of the accessory fastener devices has an accessory fastener well disposed sized to hold an accessory fastener; the one or more accessory fastener devices each disposed sized to hold an accessory fastener that secures one or more accessories to a container; any of the accessory fastener devices having a plate portion and a well portion; the well portion transverse to the plate portion; the plate portion having a plate aperture; and the well portion being hollow with the accessory fastener well comprising the plate aperture and the well portion.

28. The container assembly of claim 25 further comprising one or more wheel assemblies, wherein the one or more wheel assemblies each have one or more wheels mounted on an axle having one or more axle studs; each of the axle studs extending from the axle; the axle having a first axle element and a second axle element; the second axle element configured sized to slide into the axle first element; and the first axle element secured to the second axle element using an axle fastener.

29. The container assembly of claim 25 wherein the axle stud well disposed sized to receive an axle stud; and the axle stud fastener well disposed sized to receive an axle stud fastener; and the axle stud fastener well transverse to the axle stud well.

30. The container assembly of claim 29 further comprising one or more wheel assemblies; wherein each of the axle stud holders has the axle stud well connected to the axle stud fastener well, and one or more of the wheel assemblies is secured to the axle stud holders by the axle stud fastener disposed in the axle stud fastener well and disposed through an axle stud aperture of the axle stud when the axle stud in disposed in the axle stud well; and one or more of the axle studs extending from each of the wheel assemblies.

* * * * *